US010733306B2

(12) United States Patent
Lum et al.

(10) Patent No.: US 10,733,306 B2
(45) Date of Patent: Aug. 4, 2020

(54) WRITE-ONLY LIMITED-READ FILESYSTEM

(71) Applicant: International Business Machines Corporation, Armonk, NY (US)

(72) Inventors: Jia Jun Brandon Lum, White Plains, NY (US); Alaa Youssef, Valhalla, NY (US); Diana J. Arroyo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 15/914,570

(22) Filed: Mar. 7, 2018

(65) Prior Publication Data

US 2019/0278916 A1    Sep. 12, 2019

(51) Int. Cl.
| | |
|---|---|
| G06F 21/00 | (2013.01) |
| G06F 21/60 | (2013.01) |
| H04L 9/08 | (2006.01) |
| H04L 9/14 | (2006.01) |
| H04L 9/30 | (2006.01) |
| G06F 21/62 | (2013.01) |
| H04L 9/06 | (2006.01) |

(52) U.S. Cl.
CPC ........ *G06F 21/602* (2013.01); *G06F 21/6218* (2013.01); *H04L 9/0618* (2013.01); *H04L 9/0825* (2013.01); *H04L 9/0869* (2013.01); *H04L 9/14* (2013.01); *H04L 9/302* (2013.01)

(58) Field of Classification Search
None
See application file for complete search history.

(56) References Cited

U.S. PATENT DOCUMENTS

| | | |
|---|---|---|
| 5,142,578 A | 8/1992 | Matyas et al. |
| 6,249,866 B1 | 6/2001 | Brundrett et al. |
| (Continued) | | |

OTHER PUBLICATIONS

Lim, Hoon Wei; Yang, Guomin. Authenticated Key Exchange Protocols for Parallel Network File Systems. IEEE Transactions on Parallel and Distributed Systems, vol. 27, Issue: 1. https://ieeexplore.ieee.org/stamp/stamp.jsp?tp=&arnumber=7004049 (Year: 2016).*

(Continued)

*Primary Examiner* — Jeremiah L Avery
(74) *Attorney, Agent, or Firm* — Diana R. Gerhardt; Jack V. Musgrove

(57) ABSTRACT

A secure filesystem provides write-only access with limited read. The filesystem stores data as an encrypted block on a user machine using a symmetric (active) key, along with metadata including a read condition. While the read condition is valid, local applications can read the data using the active key. When the read condition becomes invalid, the active key is deleted so local applications no longer have access. However, the filesystem encrypts the active key to yield an inactive key, using an RSA public key. The corresponding private key is sent to an authorized party machine, but deleted from the user machine. Thus the user machine is unable to decrypt the inactive key, but the authorized party machine can still read the data by first decrypting the inactive key using the private key to regenerate the active key, and then decrypting the encrypted block using the regenerated active key.

20 Claims, 6 Drawing Sheets

(56) References Cited

U.S. PATENT DOCUMENTS

| | | | | |
|---|---|---|---|---|
| 6,970,849 | B1* | 11/2005 | DeMello | G06F 21/10 |
| | | | | 705/52 |
| 7,272,231 | B2 | 9/2007 | Jonas et al. | |
| 8,140,864 | B2 | 3/2012 | Osaki | |
| 8,607,071 | B2 | 12/2013 | Keohane et al. | |
| 8,769,272 | B2 | 7/2014 | Mattsson | |
| 9,288,208 | B1* | 3/2016 | Roth | H04L 63/0884 |
| 9,584,517 | B1* | 2/2017 | Roth | G06F 21/6209 |
| 2011/0033050 | A1* | 2/2011 | Maller | G06F 21/60 |
| | | | | 380/259 |
| 2011/0252232 | A1 | 10/2011 | De Atley et al. | |
| 2011/0252234 | A1* | 10/2011 | De Atley | H04L 9/0891 |
| | | | | 713/165 |
| 2013/0262865 | A1* | 10/2013 | Irvine | G06F 21/602 |
| | | | | 713/165 |
| 2014/0164774 | A1* | 6/2014 | Nord | H04L 63/0807 |
| | | | | 713/171 |
| 2014/0229739 | A1* | 8/2014 | Roth | H04L 63/0442 |
| | | | | 713/189 |
| 2017/0272248 | A1* | 9/2017 | Ozzie | G09C 5/00 |

OTHER PUBLICATIONS

Hoffmann, Christian et al. Towards an architecture for end-to-end-encrypted file synchronization systems. 2015 IEEE 24th International Conference on Enabling Technologies: Infrastructure for Collaborative Enterprises. https://ieeexplore.ieee.org/stamp/stamp.jsp?tp=&arnumber=7194353 (Year: 2015).*

Rahimiasl, Farshad; Azmi, Reza. SeKMAC: A secure model for key management and access control in cryptographic file system. 2011 International Conference for Internet Technology and Secured Transactions. https://ieeexplore.ieee.org/stamp/stamp.jsp?tp=& arnumber=6148429 (Year: 2011).*

Giannakopoulos, Ioannis et al. Isolation in Docker through Layer Encryption. 2017 IEEE 37th International Conference on Distributed Computing Systems (ICDCS). https://ieeexplore.ieee.org/stamp/stamp.jsp?tp=&arnumber=7980224 (Year: 2017).*

Donnelly, Patrick; Thain, Douglas. Fine-Grained Access Control in the Chirp Distributed File System. 2012 12th IEEE/ACM International Symposium on Cluster, Cloud and Grid Computing (ccgrid 2012). https://ieeexplore.ieee.org/stamp/stamp.jsp?tp=& arnumber=6217402 (Year: 2012).*

Fruhwirth, Clemens, "LUKS On-Disk Format Specification Version 1.22" [online], retrieved on Sep. 7, 2017 rom the Internet URL: https://fossies.org/linux/cryptsetup/doc,s/on-disk-format.pdf (2016).

Gitlab, "Dmcrypt" [online], retrieved on Jan. 9, 2018, from the Internet URL: https://gitlab.com/cryptsetup/cryptsetup/wikis/DMCrypt (2017).

Microsoft, "BitLocker Drive Encryption Overview" [online], retrieved on Jan. 9, 2018, from the Internet URL: https://technet.microsoft.com/en-us/library/cc732774(v=ws.11).aspx (2017).

* cited by examiner

| Filename | File1.txt | | | | | | |
|---|---|---|---|---|---|---|---|
| File Block # | 01 | 02 | 03 | 04 | 05 | 06 | 07 |
| Read Condition | Date< 01/01 | Date< 01/02 | Date< 01/03 | Date< 01/04 | Date< 01/05 | Date< 01/06 | Date< 01/07 |
| Valid Read Flag | N | Y | Y | Y | Y | Y | Y |
| Encrypted File Blocks | f101 | f102 | f103 | f104 | f105 | f106 | f107 |
| Active Keys | | f102 | f103 | f104 | f105 | f106 | f107 |
| Inactive Keys | f101 | f102 | f103 | f104 | f105 | f106 | f107 |

| Filename | File2.bin | | | | | | |
|---|---|---|---|---|---|---|---|
| File Block # | 01 | 02 | 03 | 04 | 05 | 06 | |
| | | | | | | | |

WRITE-ONLY LIMITED-READ FILESYSTEM

BACKGROUND OF THE INVENTION

Field of the Invention

The present invention generally relates to cryptographically securing computer-readable files, and more particularly to a method of imposing a file system that allows for write-only data with limited-read abilities.

Description of the Related Art

To an end user, most computer systems have the same general structure for storing and accessing data, that is, by saving the data in files whose names have a particular format, and placing the files into folders or directories to further organize them. These file objects are physically encoded in the machine's persistent storage device, e.g., hard disk. Computer operating systems such as UNIX or Windows use this type of filing system. Processes from the operating system or application programs interact with the filesystem using a specific set of commands, such as "open," "read," etc. In addition to the basic data stored in a file, a filesystem can maintain metadata regarding the files. In the earliest filesystems this metadata was limited to information such as the date the file was created or modified, certain system attributes (such as a file being read-only), and the size of the file in bytes. Modern filesystems can record much more metadata including an author of a document, a title of the document (separate from the file name), one or more tags, a revision number, etc.

There is a growing amount of sensitive and private information being recorded by devices and software in files of computing devices. It is highly desirable to protect such data from inadvertent or nefarious disclosure. The most common approach to maintaining privacy of data is encryption. Encryption is accomplished via a "key" (a numeric sequence) that is used to decipher data according to various algorithms. Keys can be symmetric or asymmetric. With symmetric keys, the same key is used to encrypt the plaintext data and to decrypt the encrypted data. With asymmetric keys, different keys are used—a private key for decrypting (only one specific private key will work) but public keys for encrypting. Thus, it is safe to publish the keys, resulting in multiple users of the same public key. In this manner anyone can encrypt messages using the public key but only the owner (i.e., the holder of the private key) is able to decrypt. Asymmetric keys can thus provide a level of authentication in addition to encryption. One of the first public-key cryptosystems was the Rivest-Shamir-Adleman algorithm, known as RSA encryption.

One common example of file encryption is the Linux Unified Key System (LUKS) which has become the standard for Linux disk encryption. It uses a device mapper target that performs encryption on a block device. LUKS follows the usual encrypted disk pattern where a symmetric key is generated that is used to encrypt the contents of the disk, and the symmetric key is then protected by a password and stored in the header of the encrypted volume. Multiple passwords may be added to provide multiple protected copies of the symmetric key.

LUKS is a popular operating system implementation of generic volume encryption. Another OS implementation is known at Bitlocker Drive. Bitlocker is used for performing full disk encryption. It is similar to LUKS with some additional features such as native support for a trusted platform module, or TPM (a specialized chip on an endpoint device that stores RSA encryption keys specific to the host system for hardware authentication).

Another encrypted file system which uses asymmetric public key-private key pairs to initialize the encrypted drive is described in U.S. Pat. No. 6,249,866. A symmetric key is then generated to perform the actual encryption/decryption in the file system. This approach is similar to LUKS with the exception that instead of the symmetric key being protected by a password (or hash thereof), it is encrypted/decrypted with the public key-private key pair. The key must be encrypted by the user's key pair as well as at least one additional key pair for the recovery agent. In order to use this file system, the user provides the private key, and the file system uses the private key to decrypt the keys to the files in the file system so that reading from disk is transparent to the user.

A different approach is taught in U.S. Patent Application Publication no. 2011/0252232, which addresses the problem of wiping data. It describes a system and method for wiping data from a disk of a remote device via the removal of keys. A key bag contains keys used to encrypt files and classes, and the deletion of the key bag is used to provide the impression of wiped data, since data is no longer accessible without its keys, assuming a strong symmetric encryption and key.

SUMMARY OF THE INVENTION

The present invention in at least one embodiment is generally directed to a method of providing access to data in a computing device by storing the data as an encrypted block of a data file in a non-volatile storage of the computing device using a symmetric encryption key specifically associated with the encrypted block wherein a filesystem of the computing device provides metadata associated with the encrypted block and the metadata includes the symmetric encryption key and a read condition specifically associated with the encrypted block, receiving a request from a local application running on the computing device to read the data, determining that the read condition is currently valid, and responsively using the symmetric encryption key to decrypt the encrypted block and provide the data to the local application. In the exemplary implementation the computing device generates an asymmetric encryption key pair including a public key and a private key, encrypts the symmetric encryption key using the public key to yield an inactive key, storing the inactive key in the non-volatile storage as part of the metadata, determines that the read condition is later invalid, and responsively deletes the symmetric encryption key from the non-volatile storage. Thereafter if there is another request from the local application to read the data, the filesystem will see that the symmetric encryption key has been deleted, and responsively deny the later request. The computing device can be a user machine, and it can send the private key to an authorized party machine and thereafter remove the private key from the user machine. Responsive to a request from the authorized party machine, the user machine can send the encrypted data block and the inactive key to the authorized party machine which can subsequently use the private key to decrypt the inactive key and thereby re-generate the symmetric encryption key. The metadata can include an indication of whether the read condition is currently valid. For example, the read condition can be time-based. The data file can have multiple encrypted blocks each having respective metadata.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIG. 3 is a pictorial representation of a write-only, limited-read filesystem in accordance with one implementation of the present invention which is carried out on the user machine of FIG. 2, showing during operation how a file can be composed of encrypted blocks with associated metadata including an active key and an inactive (further encrypted) key;

The use of the same reference symbols in different drawings indicates similar or identical items.

DESCRIPTION OF THE PREFERRED
EMBODIMENT(S)

As the amount of sensitive and private information being recorded by devices and software increases, it is becoming more difficult to adequately protect this data. An example would be the use of a medical device which records medical statistics of a patient on a daily basis, and once every month the doctor retrieves the data from the device to perform a diagnosis of the patient. It is incumbent to maintain this highly personal information confidential, and yet still allow an authorized party to access it without too much difficulty. The problem tackled here is making sure that this sensitive historical data at rest is protected from attackers, as well as while in use, yet be able to be retrieved by an authorized third party. Many file system encryption schemes today protect written data at rest, but not when an attacker can compromise the device while in use (e.g., a local application having full memory access). For example, the '866 patent mentioned in the Background does not address the situation where the system is so compromised while the file system is in use. In this case, all previously stored encrypted data can easily be decrypted as the private key is required for the use of the file system itself.

It would, therefore, be desirable to devise an improved method of cryptographically securing files in a manner which is generally write only but having limited-read capabilities. It would be further advantageous if the method could specify a variety of conditions under which read access is allowed. These and other objectives and advantages are achieved in the present invention which provides for cryptographically secure write-only, limited-read of files. The method can operate on a filesystem level that provides a workspace for local applications to use information based on a condition, not limited to time windows, number of writes, etc. In addition to the write-only, limited-read interface, the data stored in the filesystem also holds the same cryptographic properties. The filesystem manages the keys in order to ensure that content no longer readable is not available to be decrypted by an unauthorized party. The method generates at least one public key-private key pair for authorized parties. The private keys are kept securely by authorized parties, and the system uses only the public key for the filesystem. During the running of the system, sets of additional symmetric keys are generated based on the limited-read conditions and are used to encrypt data written to the filesystem. When the limited-read condition for file data is violated, the subset of symmetric keys related to the violated condition are encrypted with the public keys and stored, and the plaintext symmetric key is deleted from the system.

Figure 1:
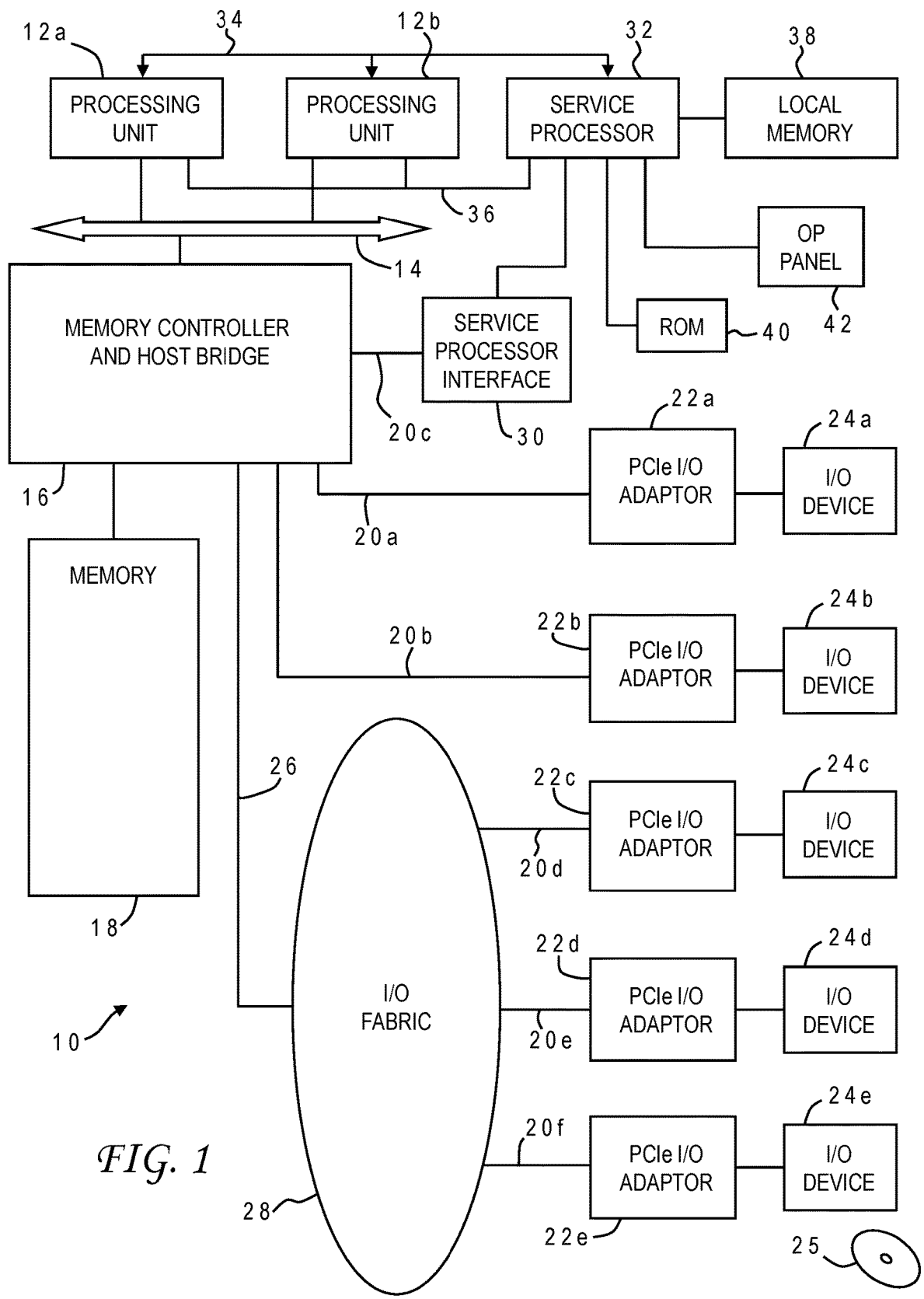
FIG. 1 is a block diagram of a computer system programmed to carry out a write-only, limited-read filesystem in accordance with one implementation of the present invention.

With reference now to the figures, and in particular with reference to FIG. 1, there is depicted one embodiment 10 of a computer system in which the present invention may be implemented to carry out a cryptographically secure filesystem. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more local applications based on the particular intended usage of computer system 10.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch local applications, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a filesystem that uses a novel encryption format to manage file security. Accordingly, a program embodying the invention may additionally include conventional aspects of various cryptographic tools, and these details will become apparent to those skilled in the art upon reference to this disclosure.

Figure 2:
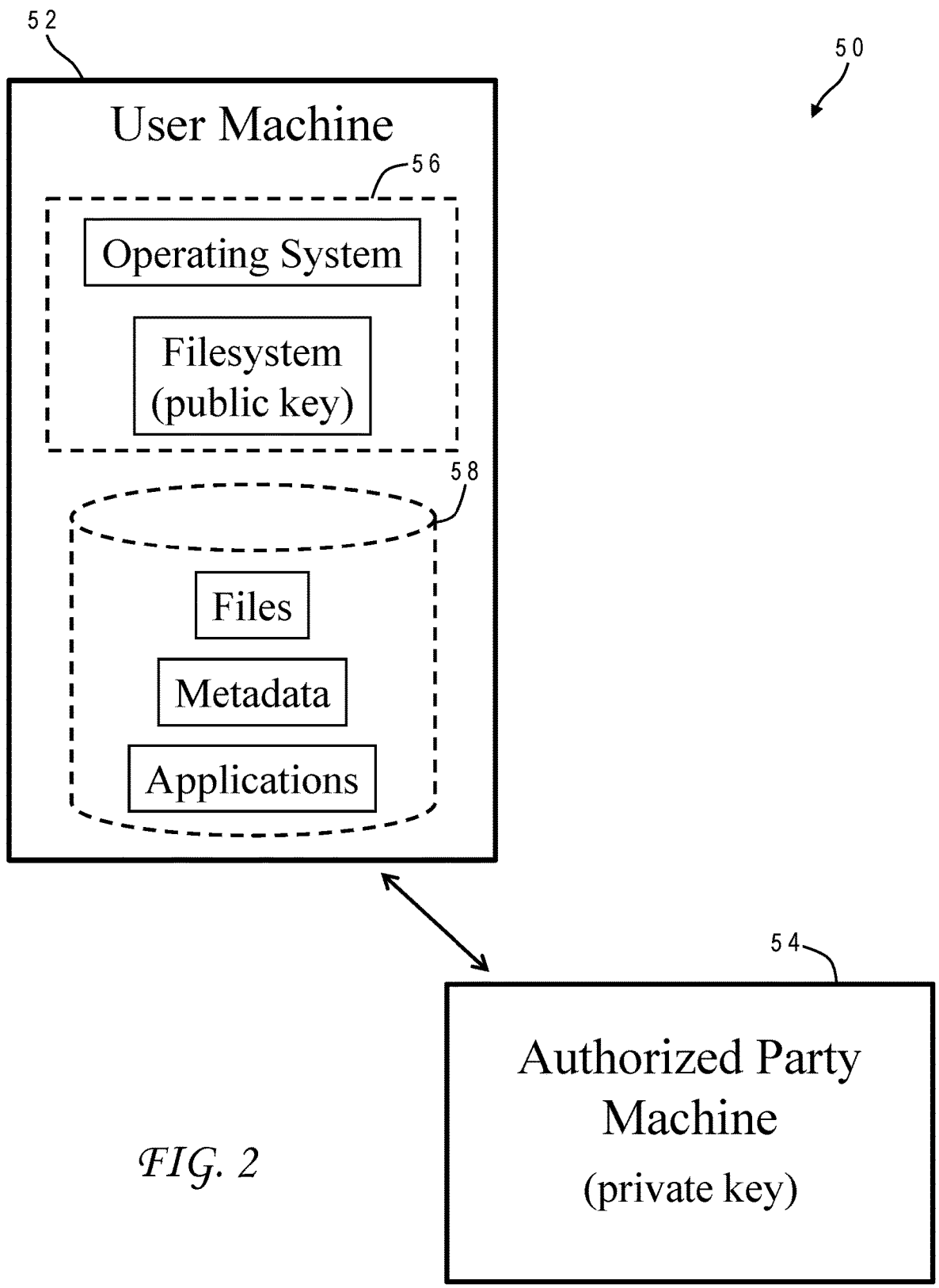
FIG. 2 is a pictorial representation of a high-level computing environment having a first computing device (user machine) that can interact with a second computing device (authorized party machine) in accordance with one implementation of the present invention.

Referring now to FIG. 2, there is depicted one embodiment of a computing environment 50 to which the present invention may be directed. Computing environment 50 includes at least two computing systems, a user machine 52 and an authorized party machine 54. Each of these machines may have the construction of computer system 10 as seen in FIG. 1, or may use alternative designs. Further to the example given above, user machine 52 may be a medical device which periodically records medical information of a patient, and authorized party machine 54 may be a computer at the doctor's office. Authorized party machine 54 may communicate with user machine 52 in any conventional manner (direct cabling, wireless transmission, or via a network such as the Internet) to allow authorized party machine 54 to read the patient data compiled in user machine 52.

User machine 52 has an operating system (OS) loaded in a system memory device 56. Also loaded in memory 56 is the novel filesystem of the present invention. The filesystem may be an extension of the OS kernel in this embodiment. However, filesystems can also be implemented on top of the OS level, such as the so-called FUSE systems which run in user space, so it may be implemented as a userspace filesystem. Files accessed through the filesystem are stored in a non-volatile (persistent) storage device (e.g., hard disk) 58 of user machine 52. This same storage 58 may contain metadata in accordance with the present invention pertaining to the files as explained further below. Storage 58 may also contain one or more local applications carried out by user machine 52. The local applications may include specific-purpose applications as well as an application that can communicate with the authorized party machine. Authorized party machine 54 has the same or similar features including the filesystem.

The filesystem in user machine 52 utilizes a public key which can be generated from RSA asymmetric keys (other algorithms besides RSA can be used to generate the asymmetric keys). As described further below, the public key can be used to encrypt additional symmetric keys that in turn encrypt different blocks of data stored in the files. The filesystem in authorized party machine 54 has the matching private key which can be used to decrypt any of the other symmetric keys.

FIG. 3 shows an example of metadata 60 used by the secure filesystem during operation on user machine 52 to protect data stored in a file "File1.txt". In this implementation each block of data has an associated condition which must be valid in order to allow local reading of the data. For this example, the condition is set as a time window, i.e., whether the current date is before a predetermined date. While this condition is suitable for purposes of discussion herein, those skilled in the art will appreciate that the nature of the conditions may vary widely. Other time-based conditions could be used (such as a time window which is relative to the timing of the write, i.e., that data can only be read for a certain amount of time). A condition might allow data to be read only a certain number of times from the disk. The condition could also be related to application-specific calls; in the case of a machine learning algorithm, it may perform some sliding window operation and would need past data to perform the operation on the current data, but after some point it does not need that data anymore and can indicate to the filesystem that it is done with that data. The filesystem can effectively become pure write-only by having a "never" condition, i.e., once a file is written it can no longer be read. This implementation is useful for logging systems. Thus the particular read conditions described herein should not be construed in a limiting sense.

Further to this example, there are seven blocks of data in the file, and each has a separate "expiration" data as a condition, that is, a date after which access to that specific block should no longer be allowed. The dates are January 1 for the first block, January 2 for the second block, and so on, with the last block expiring on January 7. Each block additionally has an associated read flag indicating whether the condition is currently valid. For this example when the current date is January 1, the valid read flag is accordingly set to not valid "N", i.e., deactivated, for the first block ("f101") while the valid read flags for the remaining blocks ("f102", ..., "f107") are set to valid "Y", i.e., activated. The metadata further includes active keys for any valid blocks. The active keys are symmetric, generated by the user machine filesystem and stored in association with respective blocks. Thus there are active keys present in the metadata of this file for blocks 2 through 7, but since the condition is not met for the first block its associated active key has been deleted by the filesystem. When a local application running on the computing device requests a read of data, the filesystem can determine when the corresponding active key has been deleted and responsively deny the request.

In addition to the active keys, the filesystem also stores inactive keys for each data block. The inactive keys are generated by encrypting respective active keys using an RSA public key. Thus, the inactive keys cannot be used to directly decrypt the encrypted file blocks. The RSA public key is generated along with the private key by the filesystem during initialization. The private key is sent to the authorized party machine and once receipt thereof is acknowledged by the authorized party machine, the filesystem on the user machine deletes the private key. Thus the only entity able to utilize the inactive keys is the authorized party, and the user machine is unable to decrypt the inactive keys.

As time progresses, the conditions set for the other data blocks will become invalid. As this occurs, the filesystem will continue to delete the corresponding active keys until no active keys remain in the user machine for this file, i.e., the user machine will be unable to read any of the encrypted file blocks. This deleting of the symmetric keys is permanent/irreversible. Different known methods may be used for permanent deletion, including zeroing out the bits in persistent storage, overwriting the bits multiple times, or using disk-specific erase functions.

Metadata 60 can be stored with the file on persistent storage but is more preferably stored in a master table separate from the file, maintained by the filesystem. Some bits of information may optionally be co-located with the associated files, e.g., in conventional filesystems those pieces of information might be the size of files, last read/modified, but the co-located information might add in read limits for each file, etc. The metadata could include an address for a memory location where a key is found rather than the actual key itself. The metadata is only available through the filesystem, i.e., there are no OS or application calls that can address the memory space occupied by the metadata table. Separate metadata is provided for each file as indicated in FIG. 3 with the second file "File2.bin" which has six file blocks.

The limited-read conditions can be set in various manners and can be implementation-specific according to the system designer. One example would be setting extended attributes of files in the filesystem via a user call, or a mount option of a volume. The filesystem can check the limited-read conditions is various ways, such as periodically or when access is attempted, or some combination thereof, depending on the type of event for limiting read access. For example, in the case of a time-based limit condition the filesystem can check every day or hour. If the limit condition is event based (e.g., limited to one hundred reads), then this could be done at access time. In another use case of limiting after a certain number of iterations of a machine learning algorithm, it could be performed once an iteration is complete.

Figure 4:
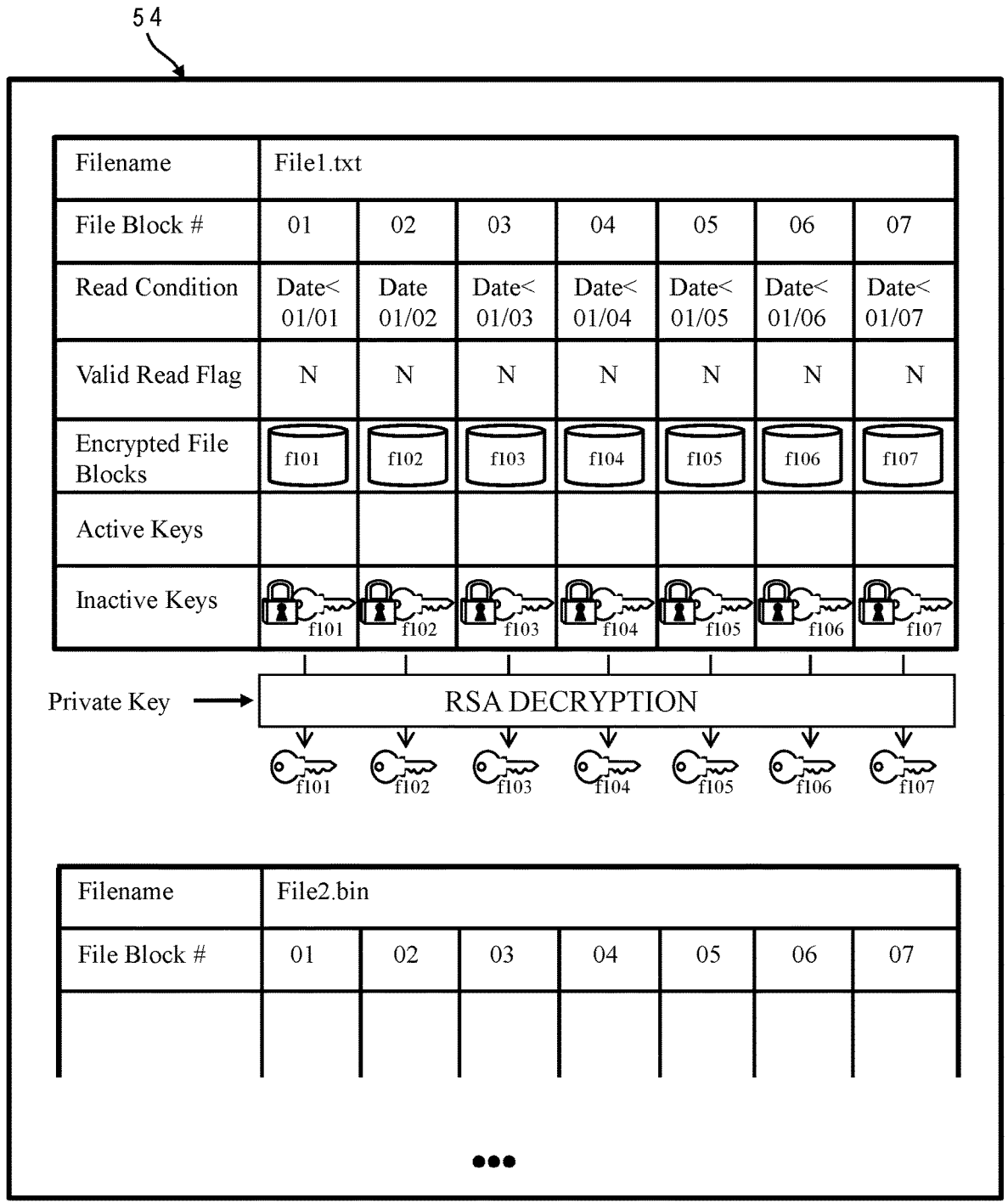
FIG. 4 is a pictorial representation of the write-only, limited-read filesystem used in FIG. 3 but now applied to the authorized party machine of FIG. 2 in accordance with one implementation of the present invention, depicting an end state where a private key held by the authorized party can be used to regenerate the active keys from the inactive keys.

FIG. 4 depicts a metadata table similar to that seen in FIG. 3 but residing on the authorized party machine as a result of reads performed by the authorized party machine while in communication with the user machine. During those reads, the encrypted file blocks are copied over to the authorized machine along with any active and inactive keys. This version of the metadata is an end state where conditions for all of the data blocks of the file "File1.txt" have be deactivated, leaving no active keys remaining. However, the authorized party machine still has access to the encrypted file blocks via the inactive keys. The authorized party machine can use the private key to perform RSA decryption and re-generate the symmetric (active) keys. Thereafter, the re-generated active key can be used to unlock the corresponding file block. As with the user machine, the authorized party machine maintains different metadata for the different files, e.g., "File2.bin".

Figure 5:
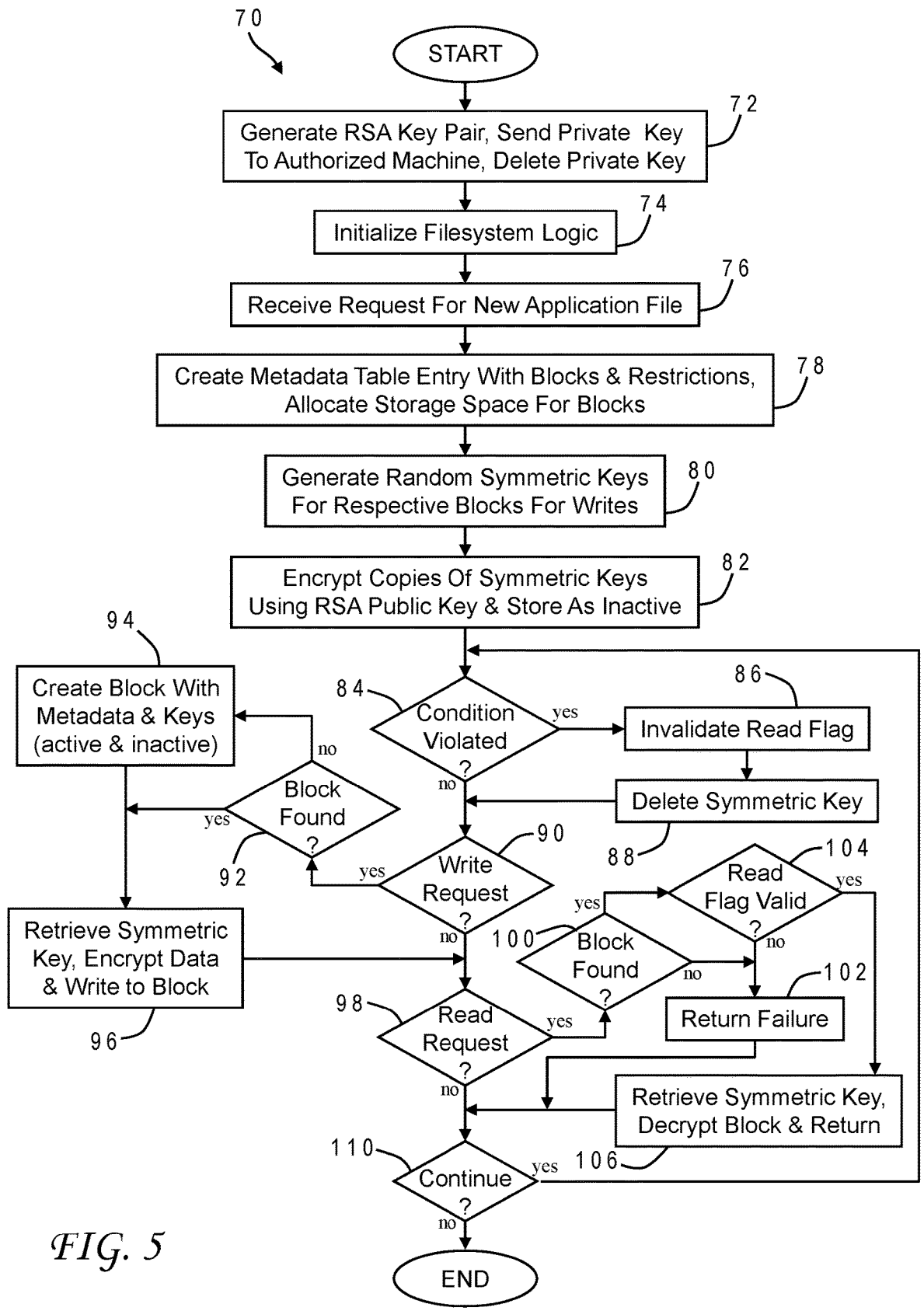
FIG. 5 is a chart illustrating the logical flow for an initialization and operation process of the user machine of FIG. 2 in accordance with one implementation of the present invention.

The present invention may be further understood with reference to the chart of FIG. 5 which illustrates the logical flow for an initialization and operation process 70 of the user machine in accordance with one implementation. Process 70 begins with generation of the RSA public-private key pair by the user machine (72). This can be performed by the OS or other initialization software. The private key is sent to the authorized party machine, and thereafter deleted from the user machine. The user machine then initializes the filesystem logic using the public key (74). In an alternative implementation, the initialization software can set a flag when creating the filesystem that informs the filesystem it should generate the RSA key pair, distribute the private key, and utilize the public key.

During the running of the user machine, the filesystem receives a request to create a new file for a local application (76). It will responsively create an entry in the metadata table for the new file with the file blocks and associated restrictions, and allocate storage space in the persistent storage device for the blocks (78). It will further generate random symmetric keys for use in writing to respective file blocks (80), and encrypt copies (inactive) of those symmetric keys using the RSA public key, and store those inactive keys (82).

The continued operation of the user machine can be viewed according to different perspectives wherein different contingencies occur. In the depiction of FIG. 5, this is represented by first checking on the conditions for each file block (84). If a condition has been violated for a block, the corresponding read flag is invalidated (86), and the symmetric key for that block is deleted from the user machine (88). Thus, the metadata will only include active keys for blocks whose conditions are still valid.

The filesystem also waits for write or read requests. When a write request is received (90), the filesystem checks to see if the requested block exists (92). If not, the block is created with corresponding metadata and keys (94). The filesystem then retrieves the symmetric key for this block, encrypts the data to be written, and writes the encrypted block to persistent storage (96). When a read request is received (98), the filesystem again checks to see if the requested block exists (100). If not, the filesystem returns a failure indication to the requesting application (102), i.e., it denies the read request. If so, the filesystem first checks to see if the read flag for the requested block is valid (104). If not, the filesystem again returns the failure indication (102). If the read flag is valid, the filesystem retrieves the symmetric key for this encrypted file block, decrypts the data, and returns the decrypted (e.g., plaintext) data to the requesting application (106). The process continues by returning to block 84 to monitoring conditions and read/write requests (110).

Figure 6:
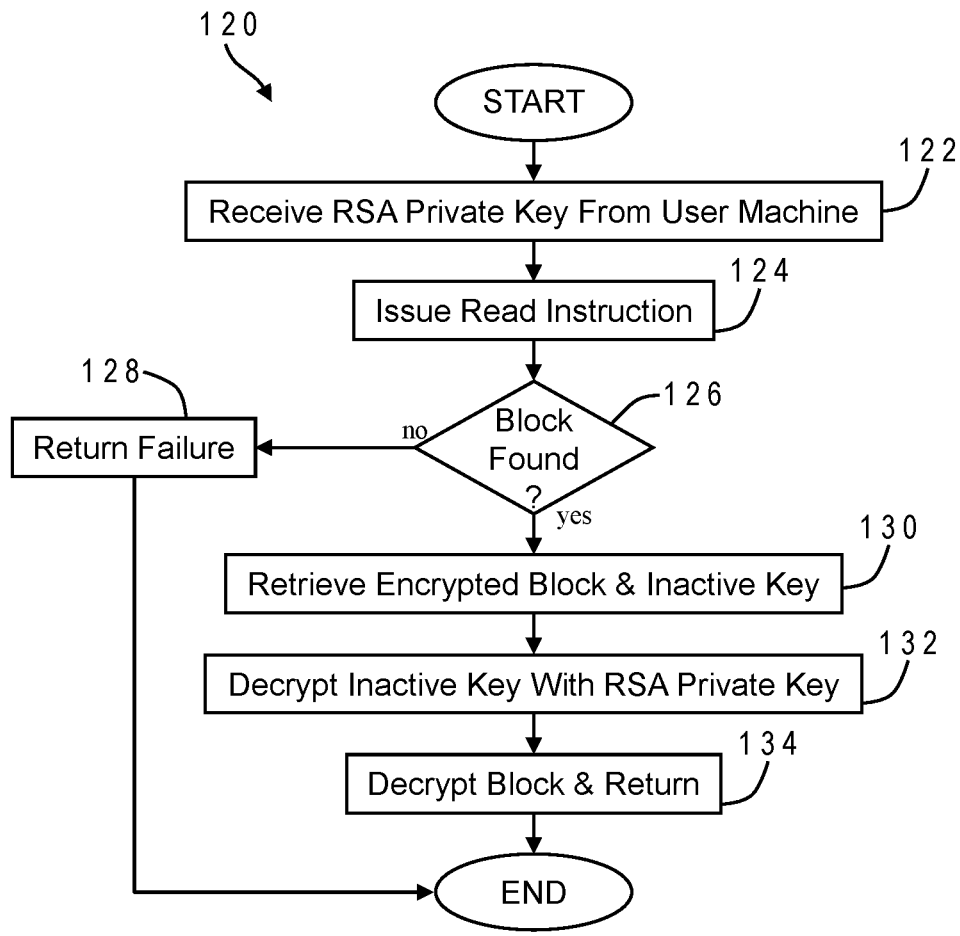
FIG. 6 is a chart illustrating the logical flow for a read process at the authorized party machine in accordance with one implementation of the present invention.

The logical flow for a read process 120 at the authorized party machine in accordance with one implementation is seen in FIG. 6. This example is for an end state of the authorized party machine wherein all active keys for a file have been deleted (since conditions for all of the blocks are invalid), but the inactive keys remain. Process 120 begins with the authorized party machine receiving the RSA private key from the user machine (122) which is stored for later use. An application on the authorized party machine will issue an instruction to read data from one of the encrypted blocks residing in its permanent storage (124). The filesystem on the authorized party machine will first check to see if the requested block exists (126). If not, the filesystem returns a failure indication to the requesting application (128). If so, the filesystem retrieves the encrypted data block and its corresponding inactive key (130) and decrypts the inactive key with the RSA private key provided by the user machine (132), to yield the appropriate active key for the block. That active key is then used to decrypt the block and the decrypted (e.g., plaintext) data is returned to the requesting application (134).

The present invention thereby affords an improved mechanism for a write-only, limited-read filesystem. This mechanism is superior compared to the approach of the '866 patent described above since that approach does not address the situation of compromised memory access while the file system is in use. In the present invention, the cryptographically secure limited-read interface protects against such attacks. The present invention is also superior to the '232 application described above since that approach leaves the deleted keys irretrievable and thus the data cannot be decrypted for use even by authorized parties, whereas the present invention still allows the data to be cryptographically readable by an authorized party.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with reference to a computing environment with only one authorized party machine, but the invention could be extended using multiple authorized parties, with policies that require minimum numbers/subsets of authorized parties to perform the authorized read, which can be enforced cryptographically. Other uses not limited to device application including logging and Internet of Things applications in motor vehicles, weather, traffic, healthcare, etc. It is therefore contemplated that such modifications can be made without departing from the spirit or scope of the present invention as defined in the appended claims.

What is claimed is:

1. A method of providing access to data in a computing device comprising:
    storing the data as an encrypted block of a data file in a non-volatile storage of the computing device using a symmetric encryption key specifically associated with the encrypted block wherein a filesystem of the computing device provides metadata associated with the encrypted block, the metadata including the symmetric encryption key and a read condition specifically associated with the encrypted block;
    receiving a request from a local application running on the computing device to read the data;
    in response to said receiving the request, determining whether the read condition is currently valid; and
    in response to said determining that the read condition is currently valid, using the symmetric encryption key to decrypt the encrypted block and provide the data to the local application.

2. The method of claim 1 further comprising:
    generating an asymmetric encryption key pair including a public key and a private key;
    encrypting the symmetric encryption key using the public key to yield an inactive key;
    storing the inactive key in the non-volatile storage as part of the metadata;
    determining that the read condition is later invalid; and
    responsively deleting the symmetric encryption key from the non-volatile storage.

3. The method of claim 2 further comprising:
    receiving another request from the local application to read the data;
    determining that the symmetric encryption key has been deleted; and
    responsively denying the other request.

4. The method of claim 2 wherein the computing device is a first computing device, and further comprising:
    sending the private key to a second computing device;
    thereafter removing the private key from the first computing device; and
    responsive to a request from the second computing device, sending the encrypted data block and the inactive key from the first computing device to the second computing device, wherein the second computing device uses the private key to decrypt the inactive key and thereby re-generate the symmetric encryption key.

5. The method of claim 1 wherein the metadata includes an indication of whether the read condition is currently valid.

6. The method of claim 1 wherein the read condition is based on a number of previous writes and/or reads of the data.

7. The method of claim 1 wherein the data file has multiple encrypted blocks with respective metadata.

8. A computer system comprising:
    one or more processors which process program instructions;
    a memory device connected to said one or more processors;
    a non-volatile storage device; and
    a filesystem residing in said memory device which provides access to data by
        storing the data as an encrypted block of a data file in said non-volatile storage device using a symmetric encryption key specifically associated with the encrypted block wherein said filesystem provides metadata associated with the encrypted block and the metadata includes the symmetric encryption key and a read condition specifically associated with the encrypted block,
        receiving a request from a local application,
        in response to receiving the request, determining whether the read condition is currently valid, and
        in response to determining that the read condition is currently valid, using the symmetric encryption key to decrypt the encrypted block and provide the data to the local application.

9. The computer system of claim 8 wherein said filesystem further generates an asymmetric encryption key pair including a public key and a private key, encrypts the symmetric encryption key using the public key to yield an inactive key, stores the inactive key in said non-volatile storage device as part of the metadata, determines that the read condition is later invalid, and responsively deletes the symmetric encryption key from the non-volatile storage device.

10. The computer system of claim 9 wherein said filesystem further receives another request from the local application to read the data, determines that the symmetric encryption key has been deleted, and responsively denies the other request.

11. The computer system of claim 9 wherein the computer system is a user machine, and said filesystem further sends the private key to an authorized party machine, thereafter removes the private key from the user machine and, responsive to a request from the authorized party machine, sends the encrypted data block and the inactive key from the user machine to the authorized party machine, wherein the authorized party machine uses the private key to decrypt the inactive key and thereby re-generate the symmetric encryption key.

12. The computer system of claim 8 wherein the metadata includes an indication of whether the read condition is currently valid.

13. The computer system of claim 8 wherein the read condition is based on a number of previous writes and/or reads of the data.

14. The computer system of claim 8 wherein the data file has multiple encrypted blocks with respective metadata.

15. A computer program product comprising:
a computer readable storage medium; and
program instructions residing in said storage medium for
a filesystem which provides access to data by
storing the data as an encrypted block of a data file in a non-volatile storage device using a symmetric encryption key specifically associated with the encrypted block wherein the filesystem provides metadata associated with the encrypted block and the metadata includes the symmetric encryption key and a read condition specifically associated with the encrypted block,
receiving a request from a local application,
in response to receiving the request, determining whether the read condition is currently valid; and
in response to determining that the read condition is currently valid, using the symmetric encryption key to decrypt the encrypted block and provide the data to the local application.

16. The computer program product of claim 15 wherein the filesystem further generates an asymmetric encryption key pair including a public key and a private key, encrypts the symmetric encryption key using the public key to yield an inactive key, stores the inactive key in said non-volatile storage device as part of the metadata, determines that the read condition is later invalid, and responsively deletes the symmetric encryption key from the non-volatile storage device.

17. The computer program product of claim 16 wherein the filesystem further receives another request from the local application to read the data, determines that the symmetric encryption key has been deleted, and responsively denies the other request.

18. The computer program product of claim 15 wherein the filesystem resides on a user machine, and the filesystem further sends the private key to an authorized party machine, thereafter removes the private key from the user machine and, responsive to a request from the authorized party machine, sends the encrypted data block and the inactive key from the user machine to the authorized party machine, wherein the authorized party machine uses the private key to decrypt the inactive key and thereby re-generate the symmetric encryption key.

19. The computer program product of claim 15 wherein the metadata includes an indication of whether the read condition is currently valid.

20. The computer program product of claim 15 wherein the read condition is based on a number of previous writes and/or reads of the data.

* * * * *